Figure 1:
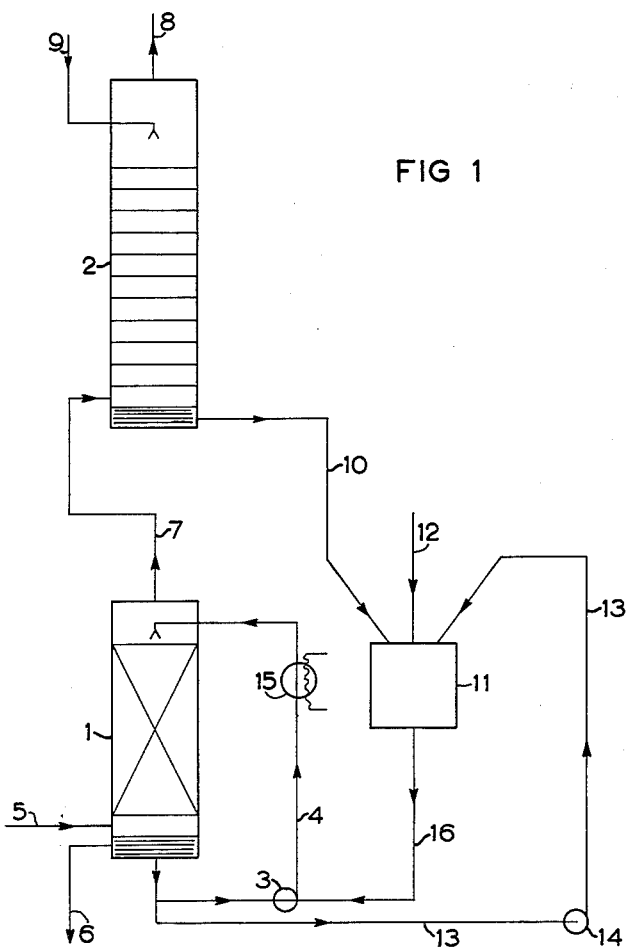

United States Patent Office

3,243,939
Patented Apr. 5, 1966

3,243,939
PROCESS FOR ABSORBING FORMALDEHYDE
FROM GASES CONTAINING THE SAME
Abraham H. de Rooij, Geleen, Netherlands, assignor to
Stamicarbon N.V., Heerlen, Netherlands
Filed Mar. 11, 1965, Ser. No. 444,895
Claims priority, application Netherlands, July 17, 1962,
281,069; Sept. 25, 1962, 283,625
9 Claims. (Cl. 55—89)

This application is a continuation-in-part of Serial No. 294,884, filed July 15, 1963, now abandoned, and Serial No. 309,246, filed September 16, 1963, now abandoned.

The present invention relates to a process for absorbing formaldehyde from gases containing the same. More particularly, the invention is concerned with the absorption of gaseous formaldehyde to obtain a concentrated solution of formaldehyde and either melamine or phenol.

It is well known that gases containing formaldehyde, for example, the gas which is obtained in formaldehyde synthesis by oxidation and/or dehydrogenation of methyl alcohol containing about equal amounts by weight of water vapor and formaldehyde, can be absorbed in an aqueous suspension of melamine comprising one part of melamine to 2–4 parts of water, which is circulated through an absorption column. The melamine is then dissolved, and a concentrated formaldehyde solution is obtained.

This known process has the disadvantage that formaldehyde absorption is incomplete. As a result, the gases discharged from the top of the absorption column still contain formaldehyde. The remaining formaldehyde must then be expelled, with the result that less concentrated solutions are formed. In addition, this process is not continuous and the ultimately obtained formaldehyde solution contains only 0.75% by weight of melamine, compared to 36.65% by weight of formaldehyde.

It is also well known that concentrated formaldehyde solutions containing about 45% by weight of formaldehyde can be stabilized by addition of 1–10% by weight of melamine. However, these concentrated formaldehyde solutions are obtained by evaporating less concentrated solutions, in vacuo, viz. solutions containing 30% by weight of formaldehyde.

The possibility of using phenol or alkyl phenols to absorb formaldehyde gas has also been proposed (British Patent 838,097) but this approach suffers generally from the same disadvantages that are encountered using melamine.

It is also well known that clear and stable solutions which contain 1–10 moles of formaldehyde per mole of phenol and in which at least part of the formaldehyde has reacted with the phenol, can be obtained by adding a concentrated (about 60% by weight) solution of formaldehyde in water to phenol dissolved in a little water (U.S. Patent 2,609,352). However, as will be appreciated, a process of this type is considerably different from the process of the present invention which is based on the direct absorption of the formaldehyde present in water vapor and formaldehyde-containing gases using phenol or melamine solutions. Moreover, the present process offers the advantage that solutions containing less water, i.e., more concentrated solutions of formaldehyde and phenol or melamine can be prepared.

As will be appreciated from the foregoing, the principal object of the present invention is to provide new and unique improvements in the absorption of formaldehyde from gases containing same whereby prior art problems are eliminated. Other advantages will also be hereinafter apparent.

Briefly stated, the process of the invention makes it possible to continuously prepare concentrated solutions of formaldehyde and either melamine or phenol by absorption of formaldehyde using either melamine or phenol for the absorption. When melamine is used, the solutions obtained are characterized by the fact that they contain, in addition to only 25–55% by weight of water, 15–25 moles of formaldehyde per mole of melamine. When phenol is used for the absorption, it is possible to continuously obtain concentrated solutions of formaldehyde and phenol which contain, in addition to only 5–50% by weight of water, 1–10 moles of formaldehyde per mole of phenol. In both the phenol and melamine embodiments, the absorption of formaldehyde is so complete that it is unnecessary, in contrast to prior practice, to discharge from the absorption system dilute formaldehyde-containing solutions which need further concentration. Additionally, the concentrated solutions thus obtained are highly suitable for use as starting materials in the preparation of formaldehyde-melamine or formaldehyde-phenol resins, at least a part of the formaldehyde in such solutions being chemically bound to the melamine or phenol.

According to melamine embodiment of the invention, a formaldehyde-containing gas is absorbed in an absorption system comprising more than one stage, the gas being contacted in the first stage with a circulating absorption solution which contains, in addition to 25–55% by weight of water, 15–25 moles of formaldehyde per mole of melamine. A portion of this circulating solution (e.g., 0.5 to 2% by volume thereof) is continuously discharged from the first stage as the concentrated product to be recovered, the discharge occurring at such a rate that the amount of formaldehyde entrained in the discharge flow per unit of time corresponds to the quantity of gaseous formaldehyde supplied. The formaldehyde not absorbed in the first stage is subsequently absorbed in a final stage by means of continuously supplied water running in counterflow. Additionally, such an amount of melamine is added per unit time to the resulting dilute formaldehyde solution of this final stage as to correspond with the amount of melamine ultimately discharged from the first stage in the recovered product. The mixture of formaldehyde, melamine and water obtained by adding the melamine to the dilute formaldehyde solution of the final stage is supplied as make-up liquid to the absorption liquid circulating through the first absorption stage. It will thus be seen that a continuous system is provided for absorbing formaldehyde gas using an aqueous melamine/formaldehyde absorption liquid to give a highly desirable concentrated solution of melamine and formaldehyde.

When using phenol, gas containing formaldehyde and water vapor is absorbed in an absorption system comprising more than one stage, the gas being contacted in a first stage with a circulating absorption solution containing 5–50% by weight of water and 1–10 moles of formaldehyde per mole of phenol. A part of this circulating solution is continuously discharged as the product to be recovered from the first stage at such a rate that the amount of formaldehyde entrained in the discharge flow per unit time corresponds to the quantity of gaseous formaldehyde supplied in the gas being treated. The formaldehyde not absorbed in the first stage is subsequently absorbed in a final absorption stage by means of continuously supplied water running in counterflow to the gas. This gives a dilute formaldehyde solution in the final stage to which there is added an amount of phenol per unit time which corresponds to the amount ultimately discharged from the first absorption stage in the recovered product and the resulting mixture of formaldehyde phenol and water is supplied as makeup liquid to the liquid circulating over the first absorption stage.

The conditions utilized are generally the same with either melamine or phenol. Thus, with either embodiment, it is simplest to use for the first absorption stage an absorption column filled with appropriate packing bodies while the final absorption stage may involve the use of an absorption column provided with plates. It is also possible, however, to use a packed column in the final stage and/or a plate column in the first stage.

In order to facilitate complete absorption of the non-absorbed formaldehyde in water and to limit the size of the absorption column needed in this process, it is possible, according to the invention, to use an intermediate absorption stage, in such a way that the gas discharged from the first absorption stage, which still contains some formaldehyde, is contacted with a circulating absorption solution containing 25–35% by weight of formaldehyde and 75–65% by weight of water. This circulating solution is continuously discharged from the intermediate stage at such a rate that the amount of formaldehyde entrained per unit time in the issuing solution is equal to the amount supplied to the intermediate absorption stage as gaseous formaldehyde. The gaseous formaldehyde not absorbed in the intermediate stage is then absorbed in the final stage by means of water running in counterflow, the resulting dilute formaldehyde solution being added as make-up liquid to the absorption solution circulating through the intermediate absorption stage. Melamine or phenol, whichever is being used, is added to the solution discharged from the intermediate absorption stage, the amount of melamine or phenol thus added corresponding to the amount ultimately discharged from the first absorption stage as recovered product and the resulting mixture of formaldehyde, melamine or phenol and water is added as make-up liquid to the absorption liquid circulating through the first absorption stage.

In order to facilitate the dissolution of solid phenol or prevent condensation of a solid formaldehyde-melamine product in the make-up liquid supplied to the first absorption column, this liquid is preferably strongly diluted, e.g., in a ratio of 1 to 10 by volume, with a portion of the liquid circulating through the first absorption column, which portion is returned to the column with the make-up liquid.

With a view to maintaining the stability of the circulating absorption solutions, these solutions are kept alkaline, for example, at a pH of 8 in the case where melamine is used and at a pH of 6–8 when phenol is used. This can be done in a simple way by the continuous addition of some NaOH to these solutions. However, if methyl alcohol is brought into the absorption system with the synthesis gas subjected to treatment so that the circulating absorption liquids contain methyl alcohol, it is unnecessary to keep the solutions alkaline since they are then sufficiently stable at lower pH values, e.g., 3–5.

The heat released by the absorption of formaldehyde is removed by cooling. Preferably, the temperature in the absorption columns is maintained at a value between 45 and 60° C. At lower temperatures, the condensation of water becomes too high and recovery of a concentrated formaldehyde solution becomes impossible. At higher temperatures, virtually complete absorption of the formaldehyde becomes difficult.

Figure 2:
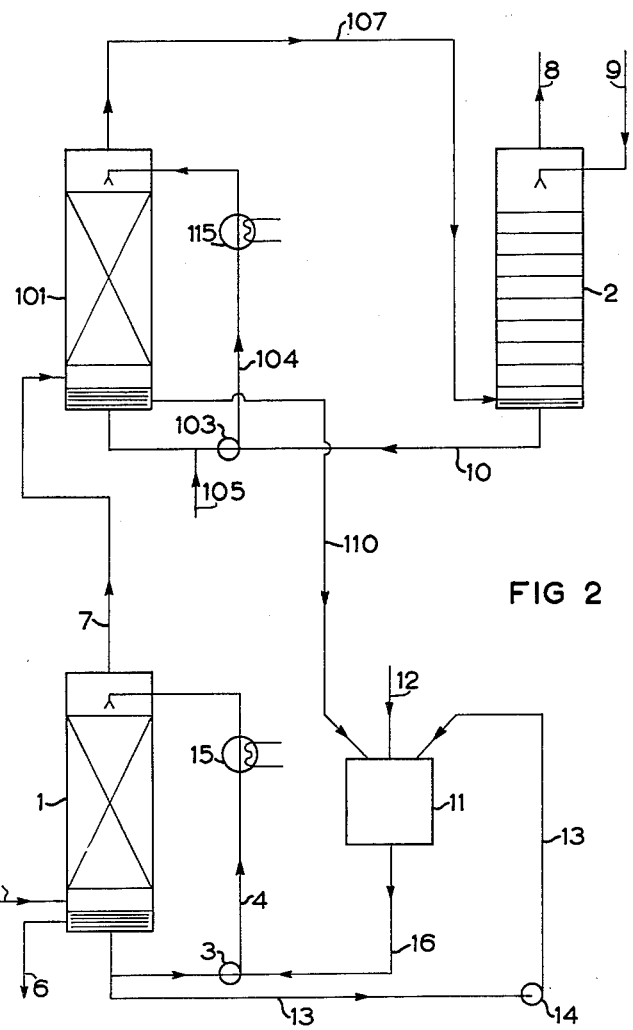

The invention is diagrammatically illustrated in FIGURES 1 and 2, FIGURE 1 showing a process which includes two absorption stages, while FIGURE 2 shows a process comprising an intermediate stage between these two stages.

Referring more specifically to the drawings, the first absorption stage consists of an absorption column 1, through which an absorption solution is circulated by means of pump 3 and conduit 4. As shown, this solution is withdrawn from the bottom of column 1 and sprayed downwardly into the column from a point adjacent the top thereof.

The heat of absorption in this circulating solution is removed by cooler 15 so that the temperature is kept within the range indicated heretofore. The synthesis gas containing formaldehyde is supplied through conduit 5 and the resulting concentrated formaldehyde solution is removed from the system through conduit 6.

At the top of column 1 gases which still contain formaldehyde are discharged through conduit 7 and are fed into the bottom of the final absorption stage represented by column 2. Water is continuously supplied to this column by means of conduit 9 while waste gases, which are practically free of formaldehyde, leave column 2 through conduit 8.

The dilute formaldehyde solution produced in column 2 is discharged through conduit 10. As shown in FIGURE 1, this solution is sent to a mixing vessel 11, to which also melamine (or phenol) and NaOH are supplied through a conduit 12. Absorption solution from column 1 is also fed into vessel 11 through conduit 13 and pump 14. The mixture thus prepared in mixing vessel 11 is then fed, by means of conduit 16, into the flow of liquid circulated back to column 1 through pump 3, conduit 4 and cooler 15. Usually, the portion of solution fed to the mixing vessel 11 comprises 2.5 to 10% by weight based on the total absorption solution withdrawn from column 1 and recycled directly through pump 3 and line 4 or indirectly by way of the mixing vessel 11.

In the embodiment of FIGURE 2, the dilute formaldehyde solution obtained in the final absorption stage, i.e., column 2 is sent through conduit 10, to an intermediate absorption stage comprising an absorption column 101 through which absorption liquid is circulated by means of pump 103 and conduit 104. The heat of absorption in this circulating liquid is removed by cooler 115 and NaOH, which serves to keep the pH value constant, is supplied through conduit 105. The gases escaping from the intermediate absorption column 101 are fed back to the bottom of the final absorption stage 2 through conduit 107, while part (e.g., 0.5 to 2% by volume) of the absorption liquid therein continuously flows through conduit 110 to the mixing vessel 11. The latter is also supplied with melamine or phenol and NaOH as aforesaid through conduit 12 and absorption solution is supplied through the conduit 13 and pump 14. As shown, the mixture leaving the mixing vessel 11 is added to the absorption solution circulating through column 1 in the system comprising pump 3, conduit 4 and cooler 15.

The process illustrated in FIGURE 1 is preferred for the preparation of solutions of formaldehyde and phenol which contain fewer than 4 moles of formaldehyde per mole of phenol, since such solutions have a very low vapor tension. On the other hand, the system of FIGURE 2 is particularly suitable for the preparation of solutions of formaldehyde and phenol which contain 4–10 moles of formaldehyde per mole of phenol, and in which the formaldehyde vapor tension rapidly rises with increasing formaldehyde content.

The invention is illustrated but not limited, by the following examples:

*Example 1*

Using the system of FIGURE 2, a synthesis gas mixture, having a temperature of 135° C. and a pressure of 1.07 atm., was fed into the column 1 at the rate of 19,700 cu. m. per hour. The gas mixture comprised 1050 kg. of formaldehyde and 985 kg. of water vapor, the remainder being mainly nitrogen and oxygen.

Absorption solution of the following composition:

53.6 percent by weight of formaldehyde
11.4 percent by weight of melamine
35.0 percent by weight of water was circulated through column 1 at the rate of $2 \times 10^5$ kg. per hour. This solution contained 20 moles of formaldehyde per mole of melamine.

In column 1 formaldehyde was absorbed at the rate of 778 kg. per hour, so that the absorption efficiency of the first absorption stage was 74 percent. In leaving the column through conduit 7 the gases had a temperature of 55° C. In column 101, formaldehyde was absorbed from these gases at the rate of 136 kg. per hour by an absorption solution of the following composition:

28.4 percent by weight of formaldehyde
71.6 percent by weight of water which was circulated through column 101 at the rate of $10^5$ kg. per hour.

The gases leaving column 101 were subjected to a final absorption treatment in column 2 by washing them with water from conduit 9 running in counterflow at the rate of 300 kg. per hour. 136 kg. of formaldehyde were dissolved in this water with the simultaneous condensation of 385 kg. of water vapor.

Tank 11 received formaldehyde solution through conduit 110 at the rate of 957 kg. per hour, melamine through conduit 12 at the rate of 225 kg. per hour, and absorption liquid through conduit 13 at the rate of 10,000 kg. per hour. The resulting mixture was fed from vessel 11 through conduit 16 into the absorption liquid circulating through column 1 in the manner shown in FIGURE 2.

Through conduit 6, the recovered product was drawn as a solution from the bottom of column 1 at the rate of 1960 kg. per hour (1050 kg. of formaldehyde, 225 kg. of melamine, 685 kg. of water).

*Example 2*

A synthesis gas mixture, having a temperature of 135° C. and a pressure of 1.07 atm. is fed into column 1 at the rate of 19,700 cu. m. per hour. The gas mixture contains 1050 kg. of formaldehyde and 985 kg. of water vapor, the remainder being mainly nitrogen and oxygen.

An absorption solution of the following composition:

46.2% by weight of formaldehyde
28.9% by weight of phenol ($C_6H_5OH$)
24.9% by weight of water circulates over column 1 at the rate of $2 \times 10^5$ kg. per hour. This solution contains 5 moles of formaldehyde per mole of phenol.

In column 1, formaldehyde is absorbed at the rate of 800 kg. per hour, so that the absorption efficiency of the first absorption stage is 76%. In leaving the column, the gases have a temperature of 55° C. In column 101, formaldehyde is absorbed from these gases at the rate of 135 kg. per hour, phenol at the rate of 15 kg. per hour, by an absorption solution circulating over the column at the rate of $10^5$ kg. per hour and having the following composition:

30.2% by weight of formaldehyde
68.0% by weight of water
1.8% by weight of phenol The gases leaving column 101, which are virtually free of phenol, are subjected to a final absorption treatment in column 2 by washing with water running in counterflow at the rate of 180 kg. per hour. In this water 115 kg. of formaldehyde and the phenol entrained are dissolved, with simultaneous condensation of 385 kg. of water vapor.

Tank 11 receives formaldehyde solution, supplied through conduit 110 at the rate of 830 kg. per hour; phenol, supplied through conduit 12 at the rate of 660 kg. per hour; and absorption liquid, supplied through conduit 13 at the rate of 10,000 kg. per hour. This mixture is then supplied via conduit 16 to the absorption liquid circulating over column 1.

Through conduit 6 a solution, the recovered product, is drawn from column 1 at the rate of 2275 kg. per hour (1050 kg. of formaldehyde, 660 kg. of phenol ($C_6H_5OH$), 565 kg. of water).

It will be appreciated that various modifications may be made in the invention described herein. For example, the present process can be realized not only with phenol itself ($C_6H_5OH$), but also with substituted monoalkyl and dialkyl phenols, for instance, cresol and xylenol. Hence, the word "phenol" as used herein is intended to stand for phenol itself as well as the substituted monoalkyl and dialkyl phenols, or mixtures of these substances.

Generally speaking, the process herein is useful for absorbing formaldehyde from any type of gas containing the same. Thus, for example, formaldehyde synthesis gases which comprise, per 1000 m.$^3$ gas, from 85 to 300 kg. of formaldehyde; the remaining components consisting essentially of from 20 to 10% water vapor; 40 to 80% nitrogen; 0 to 10% oxygen; the percentages by volume may be processed in the manner described.

The amount of phenol or melamine in the recovered product can be varied but, generally speaking, will be in the range of 0.1 to 1 mole of phenol and 0.04 to 0.07 mole of melamine per mole of formaldehyde.

Having described the invention, what is claimed as new is:

1. A process for absorbing formaldehyde from a gas containing the same so as to obtain a concentrated aqueous solution of formaldehyde and melamine, said process comprising the steps of providing a first absorption stage through which there is circulated an absorption solution containing 25–55% by weight of water and 15–25 moles of formaldehyde per mole of melamine; feeding said gas into said first stage and contacting the same therein with said absorption solution; continuously discharging from said first stage a portion of said circulating absorption solution and withdrawing the same from the system as the desired concentrated aqueous solution of formaldehyde and melamine, said solution being withdrawn from the system at such a rate that the amount of formaldehyde included therein per unit time corresponds to the quantity of formaldehyde fed to said stage in said gas; withdrawing unabsorbed gas containing the remaining formaldehyde from said first stage; feeding the unabsorbed gas into an intermediate stage wherein the unabsorbed gas is contacted with a circulating absorption solution containing formaldehyde and water; and then feeding the unabsorbed gas into a final stage; contacting the unabsorbed gas in the final stage with a continuous supply of water in countercurrent flow whereby unabsorbed formaldehyde in said gas is absorbed; recovering a relatively dilute solution of formaldehyde from said final stage and mixing the same with an amount of melamine which corresponds per unit time to the amount of melamine in the product withdrawn from said first stage; and adding the resulting mixture as make-up liquid to the circulating solution in said first stage.

2. The process of claim 1 wherein gas withdrawn from the first stage is contacted in said intermediate stage with a circulating absorption solution containing 25–35% by weight of formaldehyde, a portion of the solution circulating through said intermediate stage is continuously withdrawn from the system in an amount and rate such that the amount of formaldehyde absorbed in said intermediate stage per unit time is equal to the amount supplied to said intermediate stage as gaseous formaldehyde.

3. The process of claim 2 wherein gaseous formaldehyde not absorbed in the intermediate stage is absorbed in said final stage by said continuous supply of water in countercurrent flow.

4. The process of claim 3 wherein the dilute solution of water resulting from absorption in said final stage is added as make-up liquid to the absorption solution circulating through the intermediate stage and an amount of melamine is added to the solution discharged from the intermediate stage which is equal per unit time to the melamine discharged from the first stage and withdrawn from the system in the desired product.

5. The process of claim 4 wherein the mixture of solution discharged from the intermediate column and the melamine added thereto is fed to the first stage as make-up liquid.

6. The process of claim 1 wherein make-up liquid supplied to the first absorption stage is diluted with absorption liquid circulating through said first stage.

7. A process for absorbing formaldehyde from a gas containing formaldehyde and water vapor so as to obtain a concentrated aqueous solution of formaldehyde and phenol, said process comprising the steps of contacting the gas in a first stage with a circulating solution containing 5–50% by weight water and 1–10 moles of formaldehyde per mole of phenol; continuously discharging a portion of this circulating solution from said first stage as the recovered product at a rate such that the amount of formaldehyde entrained in the discharge flow per unit time corresponds to the qauntity of gaseous formaldehyde supplied to said first stage; removing unabsorbed gas containing formaldehyde from said first stage and feeding the same into an intermediate stage wherein the unabsorbed gas in contacted with a circulating absorption solution containing formaldehyde and water; and then feeding the unabsorbed gas into a further absorption stage; contacting said unabsorbed gas in said further stage with water continuously supplied thereto and running in counterflow to said gas; withdrawing a dilute aqeuous formaldehyde solution from said further stage and adding an amount of phenol thereto which corresponds per unit time to the amount of phenol in the solution discharged from the first stage as recovered product; and adding the resulting aqeuous mixture of formaldehyde, phenol and water as make-up to the solution circulating through said first stage.

8. A process for absorbing formaldehyde from a gas containing formaldehyde and water vapor so as to obtain a concentrated aqueous solution of formaldehyde and phenol, said process comprising the steps of contacting the gas in a first stage with a circulating solution containing 5–50% by weight water and 1–10 moles of formaldehyde per mole of phenol; continuously discharging a portion of this circulating solution from said first stage as the recovered product at a rate such that the amount of formaldehyde entrained in the discharge flow per unit time corresponds to the quantity of gaseous formaldehyde supplied to said first stage; removing unabsorbed gas containing formaldehyde from said first stage; contacting the unabsorbed gas containing formaldehyde from said first stage in an intermediate stage with a circulating absorption solution containing 25–35% by weight of formaldehyde, continuously discharging the solution from said intermediate stage at a rate such that the amount of formaldehyde entrained per unit time in the discharged solution is equal to the amount supplied to the intermediate absorption stage as gaseous formaldehyde, thereafter feeding unabsorbed gases from said intermediate stage to a further stage and absorbing formaldehyde in said further stage by contact with water in counterflow, then adding the resulting dilute formaldehyde solution as make-up liquid to the absorption solution circulating through said intermediate absorption stage, adding phenol to the solution discharged from said intermediate absorption stage in an amount equal to the amount ultimately discharged from the first absorption stage as recovered product and adding the resulting mixture of formaldehyde, phenol and water as make-up liquid to the absorption liquid circulating through the first absorption stage.

9. The process of claim 8 wherein the make-up liquid supplied to the first absorption stage is first diluted with a portion of the absorption liquid circulating through said first absorption stage.

References Cited by the Examiner

UNITED STATES PATENTS

| 2,372,085 | 3/1945 | Jones et al. | 55—89 |
| 3,067,177 | 12/1962 | Greco et al. | 55—93 X |

FOREIGN PATENTS

| 838,097 | 6/1960 | Great Britain. |

REUBEN FRIEDMAN, *Primary Examiner.*

J. ADEE, *Assistant Examiner.*